No. 838,212. PATENTED DEC. 11, 1906.
O. B. REYNOLDS.
HAY TEDDER.
APPLICATION FILED FEB. 1, 1905.
3 SHEETS—SHEET 2.
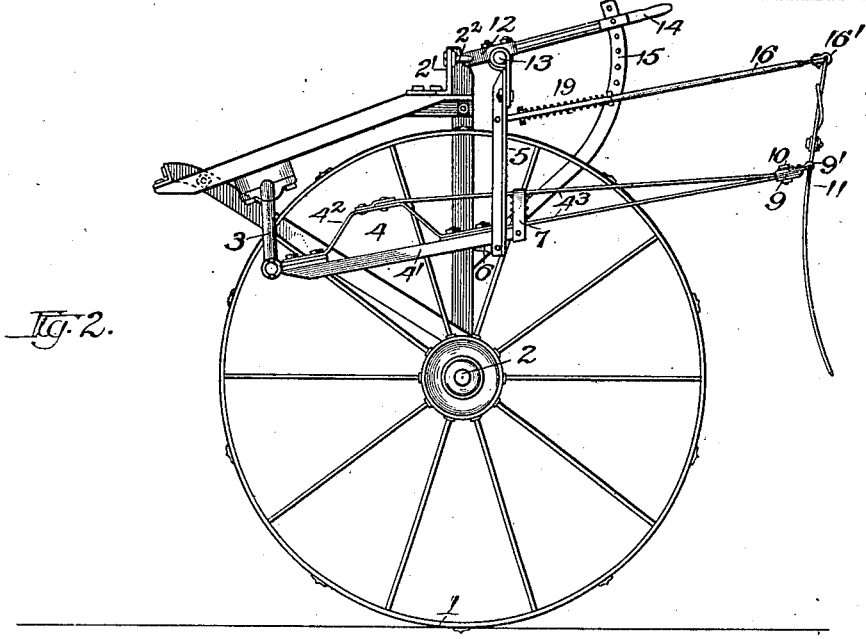
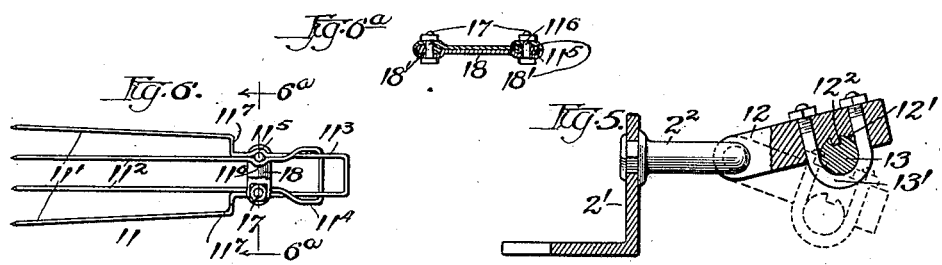
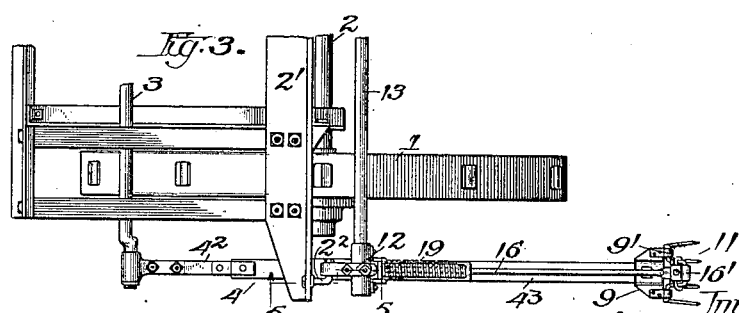
Witnesses:
Inventor:
Oliver B. Reynolds,
By J. C. Warner
Atty.

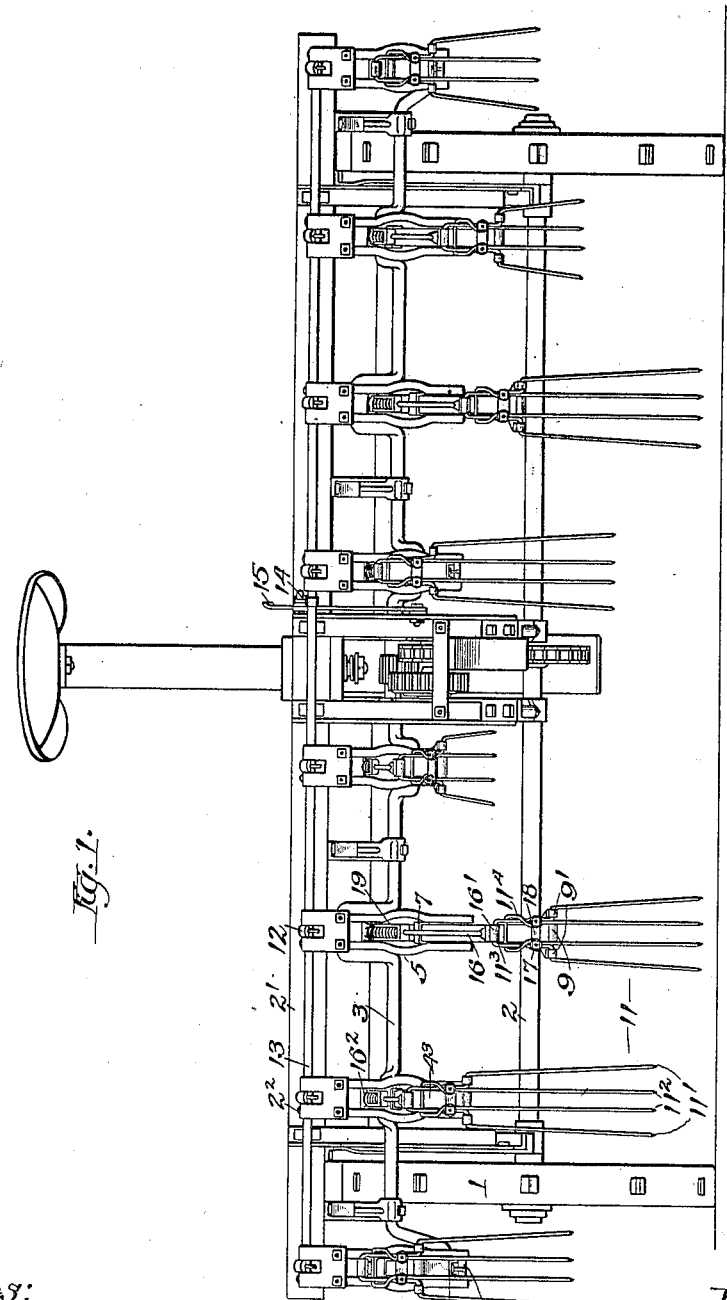

No. 838,212. PATENTED DEC. 11, 1906.
O. B. REYNOLDS.
HAY TEDDER.
APPLICATION FILED FEB. 1, 1905.
3 SHEETS—SHEET 3.
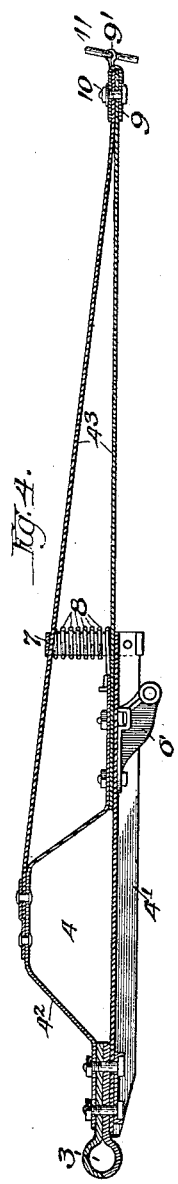
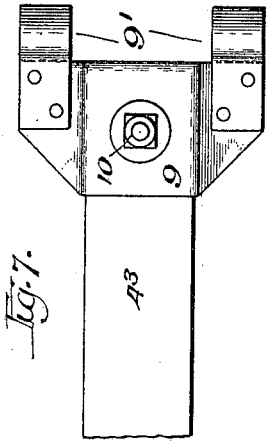
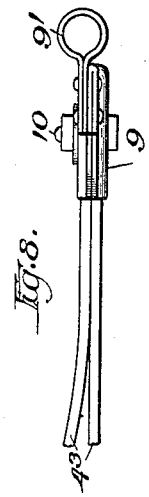
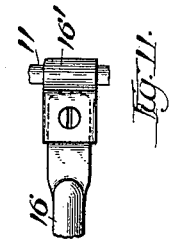
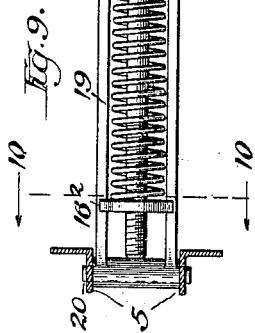
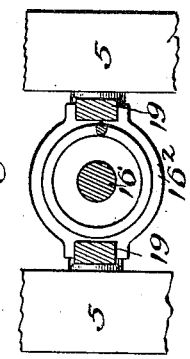
Witnesses:
T. H. Alfredo.
F. W. Hoffmeister.
Inventor
Oliver B. Reynolds
By J. C. Warnes
Atty.

UNITED STATES PATENT OFFICE.

OLIVER BRADFORD REYNOLDS, OF ELGIN, ILLINOIS.

HAY-TEDDER.

No. 838,212.  Specification of Letters Patent.  Patented Dec. 11, 1906.

Application filed February 1, 1905. Serial No. 243,670.

*To all whom it may concern:*

Be it known that I, OLIVER BRADFORD REYNOLDS, a citizen of the United States, residing at Elgin, in the county of Kane and State of Illinois, have invented a new and useful Improvement in Hay-Tedders, of which the following is a complete specification.

This invention relates to the fork-arm and fork and to the controlling means therefor, the object being to secure a greater economy in construction and a less tendency to vibrate when in operation.

The invention herein set forth may properly be regarded as a further improvement on the type of tedder shown and referred to in United States Patent No. 765,194, which was granted to me July 19, 1904.

Referring to the accompanying drawings, Figure 1 represents a rear elevation of a complete machine. Fig. 2 represents a side elevation of the same with the tongue and draft connections omitted. Fig. 3 is a plan view of the parts shown in Fig. 1, the same being a representation of the left-hand side of the tedder. Fig. 4 is a sectional view of one of the tedder or fork arms. Fig. 5 is a section through the upper angle-bar of the frame of the machine, as indicated by the line 5 5 in Fig. 3. Fig. 6 is a rear elevation of the tedder-fork, showing the preferred construction thereof; and Fig. 6$^a$ shows a transverse section through the fork-shank and fastening-plates therefor, taken as indicated by the line 6$^a$ 6$^a$ in Fig. 6. Fig. 7 represents a plan view of the rear end of one of the fork-arms. Fig. 8 is a corresponding side elevation of same. Fig. 9 represents a plan view of the forward end of the fork-controlling rod, showing the spring connection thereof, which renders it longitudinally yielding. Fig. 10 is an enlarged transverse section of same, taken as indicated by the line 10 10 in Fig. 9; and Fig. 11 is a plan view of the connection of the rear end of the fork-controlling rod with the fork.

In the following description only the new and modified parts will be specifically described, since a knowledge of the construction of the unchanged members may be had by examining the patent of reference.

In the drawings, 1 designates the main supporting-wheels, and 2 the supporting-axle, which is secured to the triangular main frame near the lower apex thereof. Journaled in suitable bearings near the front of the main frame 2 is the crank-shaft 3, while at the top of said frame and forming one member thereof is the transversely-extending angle-bar 2'. The fork or tedder arm 4 journals at its forward end on the crank-shaft 3, while at a point intermediate of its length it is supported by means of the swinging link 5.

The tedder-arms consist each of a forward rigid portion and a rear flexible portion, the rigid portion comprising the channel-bar 4' and the truss-bar 4$^2$, while the rear flexible portion is comprised of the superposed spring-bars 4$^3$, the lower one being secured to the rear end of the channel-bar 4' and the upper one to the top of the truss-bar 4$^2$. A hanger 6 is secured beneath the channel-bar and near the rear end thereof, with which the lower end of the swinging link 5 articulates. Secured to the rear end of the channel-bar 4' is the yoke 7, extending upwardly and embracing both the spring-bars 4$^3$. A coil-spring 8 is placed within the yoke in a position to bear against the upper spring-bar 4$^3$ and keep it from buckling when excessive stress is applied thereto. To the rear end of each bar of the springs 4$^3$ is secured a double clip 9. (See Figs. 7 and 8.) The clip consists of a plate having a width greater than that of the springs, the plate being folded over the ends of the springs with the laterally-projecting margins pressed together. The clip 9 is secured in place by means of the bolt 10, and to the laterally-projecting margins of said plate are secured, preferably by riveting, the strap-eyes 9', which engage the fork 11.

Secured to the transversely-extending angle-bar 2' are the hinge-bolts 2$^2$, corresponding in number and disposition with the fork-arms, and on these hinge-bolts are pivotally mounted the supporting-arms 12 of the adjustment-shaft 13. These supporting-arms 12 have formed on their under sides near their outer ends a half-round recess 12', with the key 12$^2$ left therein. In this recess 12' fits the adjustment-shaft 13, the same being provided with keyways in which are received the keys 12$^2$, while the yoke-bolts 13' secure the said shaft to the supporting-arms. The adjustment-shaft is thus movable about the pivotal axis formed by the hinge-bolts 2$^2$ and is controlled in position by means of the lever 14, which is secured to one of the hinge-bolts 2$^2$ and made to extend rearwardly, engaging the adjustment-shaft 13, and in a position within convenient reach of the operator. The said lever is held in the desired position by means of the apertured pivoted sector 15 and suitable engaging means interposed between it and the lever. This adjustment-shaft 13 thus forms a vertically-adjustable pivotal bearing for the swinging links 5, which support the fork-arms.

The forks 11 may have either two or more tines; but one having four tines is preferred. The fork consists of two hair-pin loops 11' and 11², both having shank portions 11³ and 11⁴, respectively, the outer loop 11' forming the outer tines, while the loop 11² forms the intermediate tines. The shank portion 11³ of the outer loop extends upwardly, the upper transversely-extending portion thereof engaging the clip 16' on the rear end of the fork-controlling rod 16. The shank portions 11³ and 11⁴ of the loops interlock with each other, as shown, and formed in the contiguous branches thereof are the oppositely-disposed circular deflections 11⁵ and 11⁶, respectively, which operate to form bolt-receiving apertures therein. The bolts 17 are received by the said apertures, the bolts clamping in place the two opposing plates 18, (see Fig. 6ª,) which are provided with the rearwardly-projecting flanges 18'. The flanges 18' on said plates project toward each other and are so formed as to constitute ways in which the fork-shanks lie. The circular deflections in the fork-shanks, in conjunction with the plates 18 and bolts 17, serve to hold the several branches of the fork-shanks in lateral alinement and also prevent relative longitudinal movement therebetween. At the base of the shank portion 11³ of the outer loop is formed the short transversely-extending clip-engaging portion 11⁷. This short transverse portion engages the strap-eyes 9' of the double clip 9 and forms a bearing between the fork 11 and the fork-arm 4. Since the two loops of the fork are readily detachable from each other, it follows that in the event one of the tines of either loop is broken the broken part can be replaced without requiring an entire new fork.

To the upwardly-extending portion of the shank 11' is secured the rear end of the fork-controlling rod 16, the clip 16' on the rear end thereof connecting the said rod therewith. This fork-controlling rod is arranged, preferably, substantially parallel with the fork or tedder arm which is shown in Fig. 2 and has already been described. The forward ends of the fork-controlling rod is longitudinally yielding or elastically connected to the swinging link 5 at a point preferably below the hinge connection of said swinging link with the adjustment-shaft 13. The elastic connection is shown in detail in Fig. 9. Referring to this figure, 19 represents a link, the rearward end thereof being provided with an aperture which receives the forward threaded end of the fork-controlling rod 16. The forward end of this link 19 is provided with a boss having a transversely-extending opening in which is received the pin 20, in this manner connecting said link with the angle-bars of the swinging link 5. On the forward end of the rod 16 is secured the threaded washer 16², adapted to receive the threaded end of said rod. This washer is provided with slots on either side thereof, which engage the sides of the link 19, as shown in Figs. 9 and 10. The coil-spring reacts between the said washer 16² and the rear end of the link 19, thus causing the forward end of the fork-controlling rod to bear yieldingly against the forward end of said link. In this manner the fork-controlling rod is elastically held and made longitudinally yielding in order to permit the forks to yield individually whenever an obstacle, such as a stone or stump, is met with in operation.

What I claim as my invention, and desire to secure by Letters Patent, is—

In a hay-tedder, in combination, a fork-arm, a fork pivotally mounted on the rear end thereof, said fork having an upwardly-extending shank, a swinging link pivotally supported at its upper end and connected at its lower end to said fork-arm intermediate of the length thereof, and a longitudinally-yielding fork-controlling rod connecting the upper end of said fork-shank with said swinging link, said fork-controlling rod consisting of a rod having its forward end threaded, a link or loop engaging said threaded end, a threaded washer on the forward end of said rod, and a coil-spring sleeved upon the said rod and reacting between the rear end of said link and said washer, substantially as described.

OLIVER BRADFORD REYNOLDS.

Witnesses:
GEO. W. HENDERSON,
ALFRED M. CHRISTIAN.